United States Patent [19]

Gordon

[11] Patent Number: 5,057,375
[45] Date of Patent: Oct. 15, 1991

[54] TITANIUM SILICIDE-COATED GLASS WINDOWS

[76] Inventor: Roy G. Gordon, 22 Highland St., Cambridge, Mass. 02138

[21] Appl. No.: 182,092

[22] Filed: Apr. 15, 1988

[51] Int. Cl.$^5$ .............................................. B32B 17/06
[52] U.S. Cl. .................... 428/432; 428/213; 428/336; 428/426; 428/433; 428/446; 428/699; 428/701; 428/702
[58] Field of Search ................ 428/426–428, 428/432–433, 446, 688, 689, 699, 698, 701, 702, 704, 332, 336, 213

[56] References Cited

U.S. PATENT DOCUMENTS

| | | | |
|---|---|---|---|
| 3,885,855 | 5/1975 | Gross | 428/427 X |
| 4,146,657 | 3/1979 | Gordon | 428/432 |
| 4,187,336 | 2/1980 | Gordon | 428/336 |
| 4,265,974 | 5/1981 | Gordon | 428/432 |
| 4,341,841 | 7/1982 | Ohno et al. | 428/428 |
| 4,377,613 | 3/1983 | Gordon | 428/432 |
| 4,440,822 | 4/1984 | Gordon | 428/428 |
| 4,557,943 | 12/1985 | Rosler et al. | 427/255.2 |
| 4,595,634 | 6/1986 | Gordon | 428/432 |
| 4,690,871 | 3/1986 | Gordon | 428/432 |
| 4,696,834 | 9/1987 | Varapath | 427/255.2 X |
| 4,710,426 | 12/1987 | Stephens | 428/336 |
| 4,816,054 | 3/1989 | Schmitte | 428/145 |
| 4,847,157 | 7/1989 | Goodman et al. | 428/428 |

*Primary Examiner*—Ellis P. Robinson
*Assistant Examiner*—Archene A. Turner
*Attorney, Agent, or Firm*—Samuels, Gauthier & Stevens

[57] ABSTRACT

Transparent glass windows comprising thereon titanium silicide ($TiSi_2$) as the principal solar screening layer for reducing transmission of near infrared and visible radiation. In some embodiments, a protective layer of silicon or metal oxide, about 300 angstroms thick, is placed thereover. The protective layer serves to protect the silicide from oxidation during high-temperature processing procedures and increases the abrasion-resistance of the window product. The particular importance of titanium silicide film is that it allows production of a window that is neutral in color when viewed in transmission as well as in reflection. Thus, one is able to provide a durable, pyrolytic, high-performance, color-neutral, solar-shielding window product.

10 Claims, 1 Drawing Sheet

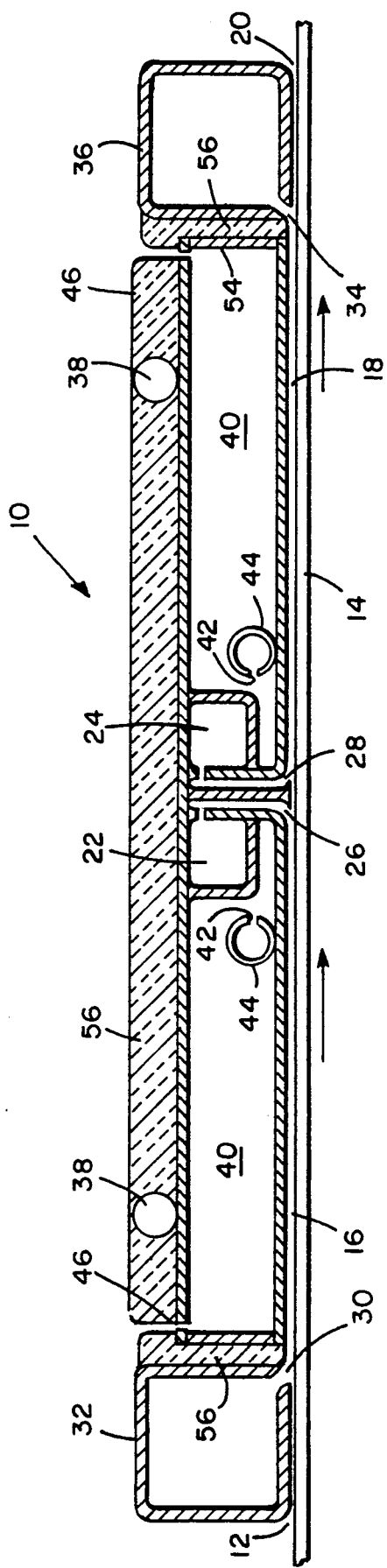
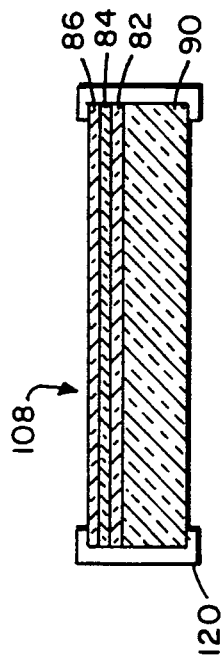
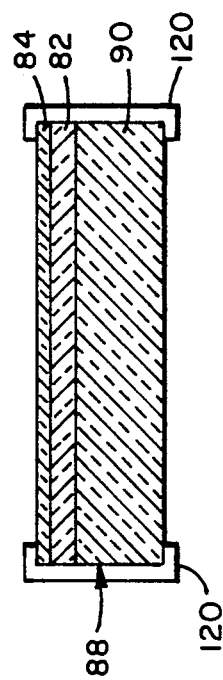

TITANIUM SILICIDE-COATED GLASS WINDOWS

BACKGROUND OF THE INVENTION

This invention relates to the improvement in providing transparent, color-neutral, glass window products particularly those used in shielding windows from excessive solar heat gain during warm weather.

Control of the solar energy entering through window areas of a building is important in maintaining comfortable indoor conditions in warm climates. Solar control has been achieved by adding light-responsive colorant materials to the glass. Tinting of glass in this way has disadvantages in production, however, since a long time may be required to change shades. More recently, reflecting and absorbing films have been applied to clear glass, to achieve solar control. Reflection of unwanted radiation is more efficient than absorption, since reflection eliminates the radiation completely, whereas part of the absorbed heat is eventually carried into the building.

It has also been proposed in U.S. Pat. No. 3,885,855 to produce solar control films by reactive sputtering of the nitrides, carbides or borides of the metals titanium, zirconium, hafnium, vanadium, niobium, tantalum, chromium, molybdenum, or tungsten. While effective optical properties were achieved for some of these materials, any large-scale production of architectural glass by the vacuum electrical method of reactive sputtering would be rather slow and expensive.

In U.S. Pat. No. 4,535,000 issued on Aug. 12, 1985, Roy G. Gordon disclosed a rapid process for deposition of transparent solar screens of titanium nitride while avoiding haze and imperfections on the sheet being coated. These improvements in titanium nitride deposition procedures did not avoid some inherent problems in achieving broad acceptance of TiN as a solar-shielding, glass-coating material in such markets as architectural glass. These problems included some susceptibility to mechanical and chemical attack and some limitations with respect to visual characteristics of TiN film, particularly the tendency to show colors in transmission, i.e. the TiN-window product as normally viewed by building occupants from inside.

Titanium-silicide-type coatings had previously been considered for use as a coating on glass. For example, Varapath in U.S. Pat. No. 4,696,834 describes a $TiSi_2$ on glass as having a silvery reflection. It is one of the many dozens of films Varapath suggested or investigated in describing a new CVD process. Also, Gross in U.S. Pat. No. 3,885,855 mentions silicides and, inferentially as part of Group IV Periodic Table, titanium silicide for solar coatings. Neither of these parties recognized any particular value to the properties of titanium-silicide coatings with respect to such films as titanium nitride coatings.

In general, it is fair to say that those investigators of the prior art, and others too, have failed to find anything about $TiSi_2$ coatings which would make it a particularly desirable commercial coating for windows and qualitatively differentiate it from comparable solar-shielding coatings such as the TiN coatings described in U.S. Pat. No. 4,535,000 to Gordon.

In fact, however, and as described below, the present inventor has discovered that the composite properties of certain $TiSi_2$-coated glass products make them unique in solar-shielding applications. In particular, they have been found to be advantageous in transmitted appearance over the previously-favored titanium nitride films.

Another type of solar-control window, one based on coatings of fluorine-doped tin oxide, is disclosed in Gordon's U.S. Pat. Nos. 4,265,974 and 4,146,657. Such tin oxide coatings are particularly valuable when high solar transmission and very low emissivity is desired, i.e. when one wishes to reduce winter heating costs. The windows of the present invention have lower solar transmission as well as low emissivity, and are preferred for many applications when economic air-conditioning of a building is an important factor.

It is to be noted that the art cited in this "background section" has necessarily been cited using the present invention as a guide in collection and interpretation of said prior art. It is not to be inferred that such diverse art would be collected without use of the invention described herein as a guide for such collection.

SUMMARY OF THE INVENTION

All of U.S. Pat. Nos. 4,535,000; 4,265,974, 4,690,871 and 4,146,657 are incorporated herein by reference.

A principal object of the invention is to provide an improved solar film characterized by good solar-shielding-window properties and a neutral color when viewed by transmitted light.

Another object of the invention is to obtain a window as described above which is also color-neutral when viewed by reflection.

Another object of the invention is to provide oxidation protection of $TiSi_2$ film during high-temperature processing of glass sheets upon which the film has been deposited.

Another object of the invention is to provide a titanium-silicide-based solar shielding window which has excellent abrasion resistance, excellent oxidation resistance after being formed in a float-glass-bath apparatus or when subjected to high-temperature annealing, tempering, or bending procedures.

Another object of the invention is to provide a process for using $TiSi_2$ as a solar shield on architectural windows, to reduce the solar heat gain during hot weather.

Other objects of the invention will be apparent to those skilled in the art on their reading of this disclosure.

The above objects have been substantially achieved by forming windows bearing titanium silicide film as the principal barrier to near infrared and visible radiation. In some embodiments of the invention, the silicide coating is covered with a coating of a protective transparent film, advantageously tin oxide. This use is analagous to that disclosed for TiN-type coatings in U.S. Pat. No. 4,690,871 to Gordon. Other protective films may be used over the $TiSi_2$. For example, silicon, silicon oxide and aluminum oxide have good protective properties. However, tin oxide and silicon films, particularly fluorine-doped tin oxide, are believed to have the most favorable combination of mechanical, optical and infrared emissivity properties to complement solar-shield applications of $TiSi_2$-coated windows. The tin oxide films are preferable for use as protective coatings on high-light-transmission glass sheets, e.g., those coated over a 200 angstrom thick $TiSi_2$ film. An example would be primary vision areas of automotive glass which must have a visible light transmission of about 70%. In any event, the protective coatings should provide adequate protection of the windows at annealing and tempering temperatures of 1000° F. and above.

It should be understood that the term $TiSi_2$ relates to coatings containing principally titanium-silicide but there may be some impurities therein in a quantity that does not interfere substantially with the advantages, described herein, of $TiSi_2$-coated window products.

In lower-transmission applications (e.g., an automotive sun roof or architectural glass) a titanium silicide thickness of about 500 angstroms, preferably in combination with a 300 angstrom overcoat film of tin oxide, would provide a highly-suitable combination for obtaining a 13% visible transmission.

Thus, among preferred products of the invention are transparent glass sheets comprising thereon titanium-silicide as the principal solar screening layer for reducing transmission of near infrared and visible radiation and, thereover, a layer of thin protective film of metal oxide or silicon of about 100 to 400 angstroms thick. The tin oxide layers are especially suitable to protect the titanium silicide from oxidation during high-temperature processing procedures, e.g. such as tempering, bending and annealing of the glass at temperatures over 1000° F., and increases the abrasion-resistance. Protective layers of about 300 angstroms or higher are preferred.

The performance of these solar-control coatings is only slightly dependent on the glass substrate on which they are placed and from which windows are to be made. However, more exact values of optimum thickness of both the silicide and any protective coating can be determined for each application of the invention after one selects a particular substrate and the desired parameters for emissivity, solar transmission, and visible transmission.

In one advantageous application of the invention, an ancillary titanium-nitride based coating is sandwiched between two protective coatings of titanium silicide. In such systems, the titanium nitride film serves the principal function of helping to reduce near-infrared (wavelengths of from about 0.7 to 2 microns) transmission without losing much in transmission of visible wavelengths. However, the undesirable transmission colors of the titanium nitride are very much reduced by the use of a major portion of titanium silicide in the coating. A protective layer over the silicide still serves to increase the abrasion resistance and serves as an oxidation-protective layer during manufacture and after the coating operation itself, in subsequent high-temperature fabrication steps such as annealing, tempering or bending processes. In such applications, it is preferred to keep the total coating thickness (less any protective layer) under 600 angstroms. This gives adequate solar protection in almost all applications and is a product that can be formed very conveniently on continuous processing equipment, e.g. float glass production lines.

$TiSi_2$ films of about 300 to 800 angstroms in thickness have neutral, i.e. silver, reflection color. Moreover, this neutral color is maintained at different thicknesses of the $TiSi_2$ coating. Thus, the windows of the invention have a neutral tone, an aesthetic property much-sought-after in solar-control windows, when viewed from either side.

The protective-coated silicide products of the invention are highly advantageous because of the combination of solar-shielding properties and the fact that they are neutrally-colored when viewed in transmission (e.g. a very light gray, which becomes darker as the thickness is increased) and the superior abrasion resistance of tin oxide relative to $TiSi_2$. However, the use of a protective coating such as tin oxide is particularly important in processing procedures. Thus, for example, transparent glass products prepared according to the invention can be annealed at typical glass-plate annealing temperatures of 1000° F. for an hour without any significant, or even detectable, oxidation of the solar-control film. Similarly, tempering at temperatures of about 1150° F. for five minutes results in no deterioration of the product.

Another important process aspect of the invention is the processing advantage associated with the conservation of titanium silicide coating which might otherwise be lost to oxidation during the process of coating hot glass with $TiSi_2$ according to such high-temperature coating procedures as described in U.S. Pat. No. 4,535,000. In such a procedure, and assuming the titanium silicide film would take about 20 seconds to move 10 feet from the exit of a float bath to a tin-oxide overcoating, then substantial titanium silicide could be oxidized to titanium oxide. Such a loss of $TiSi_2$ can often be tolerated or compensated for. But, it introduces a wholly unnecessary variable into the process.

The protective coating is of particular value in avoiding the above-described loss of silicide during the coating operation. Such conversion of silicide to oxide also introduces another variable into the product and may result in tone variations in the product as it is subjected to post-coating annealing and tempering. Tin oxide offers particular value in protecting the newly-formed titanium silicide from oxidation during annealing and tempering operations at temperatures exceeding 800° F. and, typically between 1000° and 1200° F.

Consequently, the overcoating of the silicide with tin oxide is advantageously, although not necessarily, carried out in the atmosphere of the tin bath structure in which the glass sheet to be coated is formed. This procedure allows the required amount of silicide to be used more efficiently as a solar shield and to be deposited more rapidly because no significant allowance need be made for oxidation.

The titanium disilicide films are readily formed by the reaction of titanium chloride and monosilane. The reaction occurs rapidly at temperatures typical of a float bath in glass-protection operations of the "float-glass" type wherein the glass is formed on a layer of liquid metal. Coating formation rates of above 300 angstroms per second are attainable in the float bath environment without unduly slowing the production line. Indeed, rates of above 400 angstroms per second can be achieved, and it is believed no prior art process allowed such rates to be achieved while achieving optically-clear coatings suitable for window glass.

A typical reaction mixture is about 1% $TiCl_4$, 3% $SiH_4$ and the balance an inert gas, preferably helium. These percentages are in terms of moles, not weight. These can be easily mixed at temperatures not much above room temperature (i.e. above the dew point of $TiCl_4$), and the mixture is reasonably stable and can be transported at temperatures up to about 900° F. (about 482° C.). Much above 900° F., there is the possibility of premature formation of $TiSi_2$ dust by reaction of the stored mixture's components.

The reaction to form a $TiSi_2$ coating occurs rapidly above 1200° F., desirably at about 1250° F. (about 677° C.). Most of the heat comes from the glass which is about 1250° F.

The TiSi$_2$-coated windows of the invention have better (lower) shading coefficient than do silicon films of equal visible transmission, and have surprisingly high absorption and/or reflection throughout the visible spectrum and into the near infrared spectrum. The films do not tend to display interference colors as they are made thicker. Thus, thickness adjustments can be made to obtain the desired amount of solar-shielding without having to make any other process changes to maintain color neutrality.

It is often desirable to form a very thin silicon precoat —as is known in the glass producing art—between the glass substrate and the TiSi$_2$ coating in order to reduce the probability of haze being created by reaction of chlorine (from the TiCl$_4$) and sodium in the glass. Such a silicon precoat also improves the properties of the TiSi$_2$, increasing its electrical conductivity and infrared reflectivity, and decreasing its emissivity.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

BRIEF DESCRIPTION OF THE DRAWINGS

FIG. 1 illustrates schematically a specific embodiment of the invention.

FIG. 2 illustrates an embodiment of the invention comprising the use of a titanium nitride layer between two titanium silicide layers.

FIG. 3 illustrates a reactor-coater apparatus useful in making the product.

FIG. 1 illustrates schematically, a transparent solar-shield window product 88 held in a frame 120 suitable for use as architectural glass and comprising a soda lime glass substrate 90, a coating 82 of about 400 angstroms of TiSi$_2$, and a protective coating of 300 angstroms of fluorine-doped tin oxide 84. The tin oxide coating is achieved using reactant system for SnO$_2$ known in the art, e.g. that described in U.S. Pat. Nos. 4,265,974 and 4,146,657.

The structure according to FIG. 1 is modified by replacing the tin oxide with 200 angstroms silicon, in one instance, and 200 angstroms aluminum oxide in another instance. Both of these oxides form good protective coatings over the tin silicide.

It is possible to co-deposit TiN and TiSi$_2$ to form products of intermediate properties because the reaction conditions for forming these films are so similar. However, there is no great advantage in so doing because TiSi$_2$ is a wholly satisfactory color-neutral product.

However, FIG. 2 illustrates the transparent portion of a window product 108 having a titanium nitride-bearing coating on glass substrate 90 as follows:
Coating 82: 200 angstroms of TiSi$_2$
Coating 84: 200 angstroms of TiN
Coating 86: 200 angstroms of TiSi$_2$
(The recommended protective overcoat of, say 300 angstroms of silicon or metal oxide is recommended but not shown in FIG. 2). This product utilizes TiN to improve the solar shield properties of the device. The TiSi$_2$ layers serve, not only their solar-shielding properties, but also serve to effectively mute the objectionable yellow tone that is apparent when a TiN-coated window is viewed by reflection.

A reactor system may be used as shown in U.S. Pat. No. 4,535,000 to Gordon or as described in FIG. 1 of this disclosure.

Referring to FIG. 3, it is seen that coating apparatus 10 is arranged to receive a hot glass sheet along a process line which, for example, can be a float-glass-type processing line.

Apparatus 10, best mounted in a float-glass process housing, comprises an entry port 12 for glass sheet 14, a first coating-reactor zone 16, a second coating-reactor zone 18, and a glass exit port 20. Coating reactor zones 16 and 18 are supplied with a gaseous reaction mixture via gas inlet manifolds 22 and 24, respectively and gas feed orificies 26 and 28 respectively. The reactant mixture supplied via the flowpath comprising manifold 22 and gas feed orifice 26 provides a reaction mixture which flows countercurrently along the glass in zone 16 progressing towards gas outlet port 30 and gas outlet manifold 32.

The reactant mixture supplied via a flowpath comprising manifold 24, and gas feed orifice 28 is a reaction mixture which flows concurrently along the glass in zone 18 progressing towards gas outlet port 34 and gas outlet manifold 36. Each reactant mixture is so selected that it deposits a thin coating of the appropriate thickness. However, the coating formulation should be modified as described herein. The reaction mixtures are selected so that they will be substantially depleted before reaching the gas outlet ports.

The overall length of the apparatus from gas inlet to gas outlet is conveniently selected to be about 12 inches. The apparatus is suspended from, or mounted on, support pipes 38. The reaction rates and other reaction zone conditions are substantially improved by maintaining those surfaces of apparatus 10 which are in the reaction zone at a relatively low temperature to inhibit deposition of coating material thereon. Thus, cooling fluid, say nitrogen gas, is fed into each of two cooling chambers 40, each associated with one of reaction zones 14 and 16. The cooling gases enter through ports 42 in cooling supply pipes 44. The gases are removed from the coating apparatus 10 at exit port 46.

The space proximate the glass at entry port 12 and exit port 20 is brought as close as is practical to glass sheet 14 to minimize leakage. However, when the reactants are properly selected so that they near effective depletion of silane and titanium tetrachloride reactants close to the exit port and entry port, respectively, this sealing is not particularly critical to the process. Thermal insulation 56 helps to maintain the proper temperature for operation of the apparatus by separating the hot gas outlet manifold from the gas cooled housing 54. In practice the apparatus is suitably positioned to provide about 0.25-inch height to the gas flow over the glass substrate. Molten tin supports the glass as it moves along the processing line in the manner well-known in the glass-making industry.

It is also to be understood that the following claims are intended to cover all of the generic and specific features of the invention herein described and all statements of the scope of the invention which might be said to fall therebetween.

What is claimed is:

1. In a window having a transparent coated glass member, said member mounted in a frame so that it has a first surface facing outwardly of a structure and a second surface facing inwardly of said structure, the improvement wherein the window consists essentially of
   a) a transparent glass substrate;
   b) a transparent coating comprising titanium silicide on said substrate to enhance the solar-shielding properties of said window while preserving a color-neutral appearance of said window when viewed from either surface of said window; and
   c) a protective overcoat for said titanium silicide coating on said window, said protective overcoat comprising silicon or a metal oxide selected from the group consisting of alumina, silica or tin oxide.

2. A window as defined in claim 1 wherein said titanium silicide coating is about 200 to 800 Å.

3. A window as defined in claim 1 wherein said protective overcoat is about 200 to 400 Å.

4. A window as defined in claim 1 wherein said window consists essentially of in addition to said glass substrate, a sequence of coatings thereover, said sequence of coatings being, from the glass outwardly,
   (1) a coating of about 200 Å of titanium silicide;
   (2) a coating of about 200 Å of titanium nitride; and
   (3) a coating of about 200 Å of titanium silicide.

5. A window as defined in claims 1 or 5 wherein said protective overcoat has a thickness of about 100–400 Å.

6. A window as defined in claim 1 wherein said protective overcoat is formed of tin oxide.

7. A solar screening transparent sheet product having a first surface and a second surface, the sheet product being color neutral when viewed from either surface and characterized by oxidation resistance during annealing, tempering, bending or other processes at temperatures above 800° F., said product consists essentially of
   a) an exterior film of silicon or a metal oxide selected from the group consisting of alumina, silica or tin oxide;
   b) a film of titanium silicide under said silicon or metal oxide and forming the principle barrier to near infrared and visible radiation of said product; and
   c) a substrate of transparent glass under said film of titanium silicide.

8. A sheet product as defined in claim 7 wherein said exterior film of silicon or metal oxide is in a range from about 100 to 400 Å.

9. A sheet product as defined in claim 7 wherein said exterior film is of tin oxide and is a means to provide abrasion resistance superior to the abrasion resistance of titanium silicide.

10. A sheet product as defined in claim 7 wherein the titanium silicide has a thickness of about 300–800 Å.

* * * * *